United States Patent

Nobumoto et al.

Patent Number: 4,671,138
Date of Patent: Jun. 9, 1987

[54] SPEED RATIO CONTROL OF A STEPLESSLY VARIABLE VEHICLE TRANSMISSION

[75] Inventors: Kazutoshi Nobumoto; Shizuo Sumida, both of Hiroshima, Japan

[73] Assignee: Mazda Motor Corporation, Hiroshima, Japan

[21] Appl. No.: 665,043

[22] Filed: Oct. 26, 1984

[30] Foreign Application Priority Data

Oct. 31, 1983 [JP] Japan ............... 58-205043

[51] Int. Cl.⁴ .......................... B60K 41/14
[52] U.S. Cl. ...................... 74/862; 74/866; 474/12; 364/424.1
[58] Field of Search ........... 74/866, 862, 863, 865, 74/858, 872; 364/424.1; 474/12, 18, 28, 70

[56] References Cited

U.S. PATENT DOCUMENTS

| | | | |
|---|---|---|---|
| 3,640,156 | 2/1972 | Mori et al. ............... | 74/844 X |
| 3,893,344 | 7/1975 | Dantlgraber et al. ...... | 74/867 |
| 4,459,878 | 7/1984 | Frank .................... | 74/866 X |
| 4,470,117 | 9/1984 | Miki et al. .............. | 474/18 X |
| 4,471,437 | 9/1984 | Yoshino et al. .......... | 74/866 |
| 4,490,790 | 12/1984 | Shinoda .................. | 74/866 X |
| 4,505,169 | 3/1985 | Ganoung ................. | 74/866 X |
| 4,507,986 | 4/1985 | Okamura et al. .......... | 74/866 |
| 4,515,041 | 5/1985 | Frank et al. ............ | 74/865 X |
| 4,523,281 | 6/1985 | Noda et al. ............. | 74/866 X |
| 4,543,077 | 9/1985 | Yamamioro et al. ........ | 474/18 X |

FOREIGN PATENT DOCUMENTS

55-76709 6/1980 Japan .

Primary Examiner—Leslie Braun
Assistant Examiner—Martin G. Belisario
Attorney, Agent, or Firm—Fleit, Jacobson, Cohn & Price

[57] ABSTRACT

A steplessly variable vehicle transmission has a speed ratio control system including an electronic control unit which functions to calculate a required vehicle acceleration rate based on the position of an engine control foot pedal and the rate of change of the position of the foot pedal. The control unit further calculates an engine output power required for accomplishing the vehicle acceleration rate, as well as the engine speed under which the required engine output power can be obtained with the given position of the engine control foot pedal. Further, the control unit produces an output for controlling the speed ratio of the transmission so that the required engine speed is obtained.

7 Claims, 7 Drawing Figures

SPEED RATIO CONTROL OF A STEPLESSLY VARIABLE VEHICLE TRANSMISSION

BACKGROUND OF THE INVENTION

1. Field of the Invention

The present invention relates to steplessly variable transmissions and more particularly to a speed ratio control for steplessly variable transmissions. More specifically, the present invention pertains to steplessly variable transmissions provided with electronic control means for controlling the speed ratio in accordance with engine operating conditions. Further, the present invention also relates to a method for controlling a steplessly variable vehicle transmission.

2. Description of the Prior Art

In vehicles provided with steplessly variable transmissions, the speed ratio of the transmission is controlled in accordance with vehicle or engine operating conditions, such as the vehicle speed, the engine speed and the engine throttle valve position or the like. One example of such speed ratio control is shown in Japanese laid-open patent application No. 55-76709. In a conventional speed ratio control, the speed ratio is determined so that a desired engine speed is obtained with respect to a given engine throttle valve position. In other words, under a given throttle valve opening, a predetermined engine speed is obtained so that the engine produces a predetermined output.

In the usual operation of a vehicle, an acceleration is performed by actuating an engine control foot pedal to thereby increase the throttle valve opening. In this instance, it is desirable for obtaining a feeling of vehicle acceleration to have a rate of acceleration to be continuously maintained in an amount corresponding to the amount of actuation of the foot pedal. It should however be noted that, in a vehicle provided with the aforementioned steplessly variable transmission, wherein the speed ratio is controlled so that a predetermined engine speed is attained under a given throttle valve opening, the engine speed is immediately increased to the predetermined value as soon as the engine control foot pedal is depressed, and thereafter the engine speed and therefore the engine output is maintained during the acceleration. Since the drag force on the vehicle gradually increases as the vehicle speed increases, the driving effort applied to the vehicle is gradually decreased as far as the engine output is maintained substantially constant as described above irrespective of the increase in the drag force, with the result that the acceleration rate is correspondingly decreased. This will give the operator an unsatisfactory feeling of acceleration. A further disadvantage in the conventional control is that the engine speed is maintained substantially constant in acceleration and deceleration, and there is no dynamic change in the engine noise so that the operator will be dissatisfied in respect of the acoustic effect.

OBJECT OF THE INVENTION

It is therefore an object of the present invention to provide a steplessly variable transmission having an electronic speed ratio control system which controls the speed ratio of the transmission in such a manner that a desired acceleration rate can be maintained.

Another object of the present invention is to provide a steplessly variable transmission having an electronic speed ratio control system for controlling the speed ratio of the transmission so as to maintain a desired acceleration rate which is determined in accordance with the position of an engine control member.

A further object of the present invention is to provide a method for controlling a steplessly variable vehicle transmission with which a desired acceleration rate can be maintained.

SUMMARY OF THE INVENTION

According to the present invention, the above and other objects can be accomplished by a steplessly variable vehicle power transmission device for a vehicle including steplessly variable transmission means having input means connected with engine means, speed ratio adjusting means for adjusting the speed ratio of said transmission means, engine condition detecting the means for detecting position of an engine output control means to produce an engine condition signal, control means responsive to said engine condition signal to determine a desired vehicle acceleration rate and to produce a control signal which is applied to the speed ratio adjusting means so that the speed ratio of said transmission means is adjusted to obtain the desired acceleration rate. In a preferable aspect of the present invention, the control means includes means for obtaining a desired acceleration rate based on the position and the rate of change in the position of the engine output control means, and for obtaining a required traction effort for attaining the desired acceleration rate, and to with determine a desired speed ratio.

The transmission means may be of the belt-pulley type and the speed ratio adjusting means may include hydraulic actuator means and solenoid valve means. The engine output control member may be a foot pedal, and the engine condition detecting means may comprise switch means for detecting the position of the foot pedal.

The present invention further provides a novel method for controlling the steplessly variable transmission.

BRIEF DESCRIPTION OF THE DRAWINGS

In the accompanying drawings:

FIG. 1 is a diagrammatical illustration of a vehicle transmission control system in accordance with one embodiment of the present invention;

DESCRIPTION OF THE PREFERRED EMBODIMENT

Referring to the drawings, particularly to FIG. 1, there is shown an engine 1 which may be of a reciprocating piston type and has an output shaft 6 connected with a clutch assembly 7. The clutch assembly 7 has an output member 14 which is connected through a gear box 8 with an input member 16 of a steplessly variable, belt-pulley type transmission 9. The transmission 9 has an output member 10 which is connected through a differential gear mechanism 11 with vehicle drive wheels 12.

Figure 2:
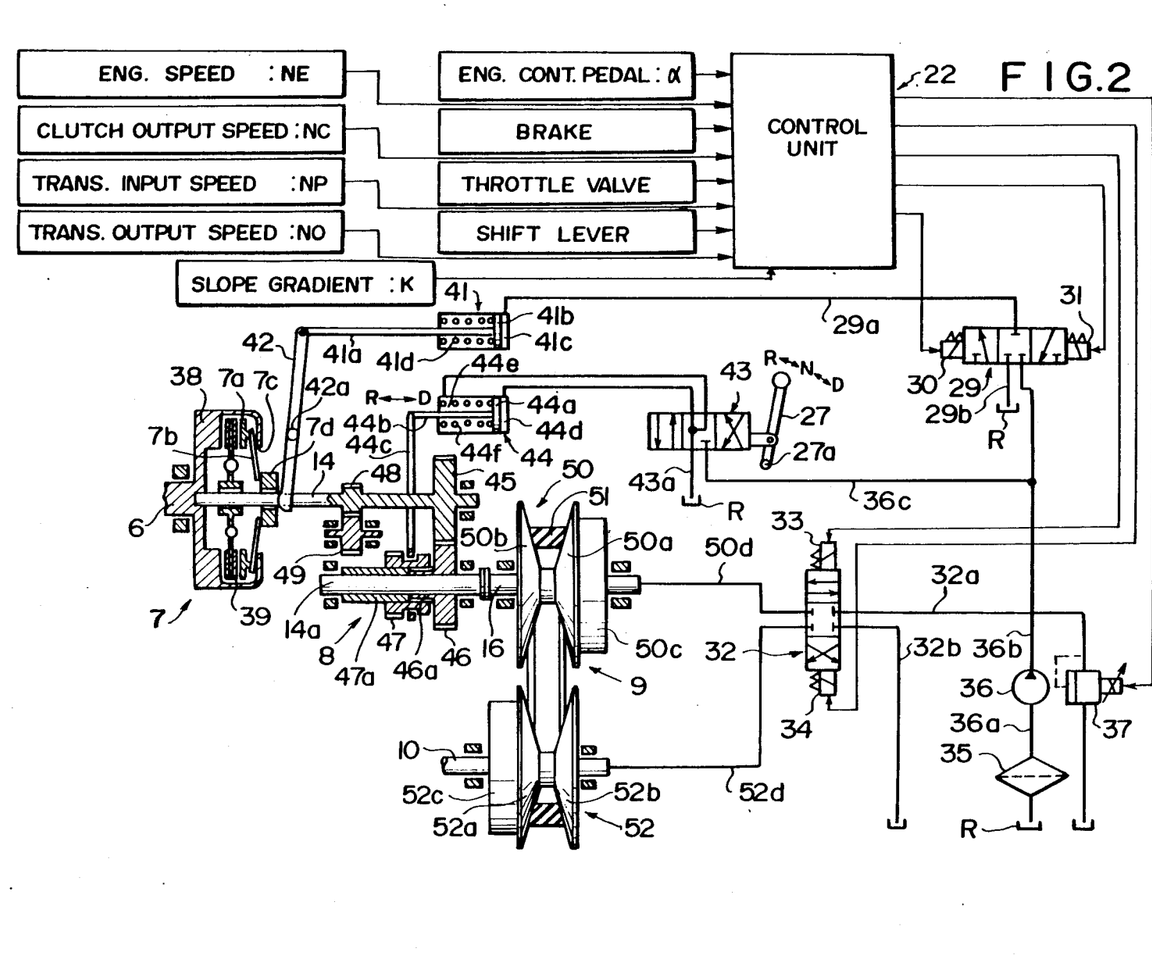
FIG. 2 is a diagrammatical illustration specifically showing a transmission mechanism and an hydraulic control circuit in accordance with one embodiment of the present invention.

The engine 1 has intake branch passages 2a, 2b, 2c, 2d which are in communication with an intake passage 2 provided with a throttle valve 3 which is operated by a throttle valve actuator 4. The vehicle is also provided with a brake pedal 25. Referring to FIG. 2, the clutch 7 includes a clutch disc 39 engaged through spline teeth with the output member 14.

The engine output shaft 6 is connected with a flywheel 38 which is placed opposite to the clutch disc 39. In order to force the clutch disc 39 into a frictional contact with the flywheel 38, there is provided a pressure plate 7a which is engaged by a dish-shaped spring 7b swingable about a fulcrum 7c. A sleeve 7d is placed on the output member 14 for axial slidable movement and rotation with respect to the output member 14. The sleeve 7d is adapted to engage the spring 7b to force the radially inner edge of the spring 7b in an axial direction. When the sleeve 7d is shifted leftward, the radially inner edge of the spring 7b is forced leftward so that the spring 7b is swung about the fulcrum 7c producing a rightward movement of the spring 7b at the radially outer edge to release the pressure plate 7a from the clutch disc 39. Thus, the clutch 7 is disengaged. When the sleeve 7d is shifted rightward, the resiliency of the spring 7b functions to move the radially outer edge of the spring 7b leftward forcing the pressure plate 39 toward the clutch disc 39. Thus the clutch disc 39 is engaged with the flywheel 38.

In order to produce the axial movement of the sleeve 7d, there is provided an actuating lever 42 which is pivotable about a pin 42a and has one end engaged with the sleeve 7d. The other end of the lever 42 is connected with a piston rod 41a of a cylinder 41 having a piston 41b. In the cylinder 41, there is defined a pressure chamber 41c at one side of the piston 41b. At the other side, there is provided a spring 41d which forces the piston 41b toward the right. Thus, the piston 41b is normally held at a rightwardly shifted position under the influence of the spring 41d to hold the sleeve 7d at the leftwardly shifted, clutch release position. When a hydraulic pressure is introduced into the chamber 41c, the piston 41b is moved leftward to thereby move the sleeve to the rightwardly shifted, clutch engage position.

There is provided a hydraulic circuit including a hydraulic pump 36 which draws hydraulic oil from a reservoir R through a strainer 35 and a suction line 36a and discharges pressurized oil to a pressure line 36b. The pressure line 36b is connected through a three-way solenoid valve 29 to a clutch control line 29a which leads to the pressure chamber 41c. The solenoid valve 29 includes an engaging solenoid 30 and a disengaging solenoid 31. When the engaging solenoid 30 is energized, the valve 29 connects the pressure line 36b to the clutch control line 29a but, when the disengaging solenoid 31 is energized, the line 29a is disconnected from the line 36b and opened to a line 29b leading to the reservoir R. When both of the solenoids 30 and 31 are de-energized, the line 29a is closed and the piston 41b and the piston rod 41a are locked.

The gear box 8 includes a first gear 45 and a second gear 48 having a diameter smaller than the gear 45, both formed on the output member 14 of the clutch 7. There is provided an output shaft 14a which is parallel with the output member 14 of the clutch 2. Between the output member 14 and output shaft 14a, there is a counter-shaft provided with a reverse counter gear 49 which is in meshing engagement with the second gear 48. An intermediate gear 46 is rotatably mounted on the output shaft 14a and in meshing engagement with the first gear 45. The output shaft 14a is fitted with a sleeve 47a on which a clutch gear 47 is mounted through spline teeth so that the gear 47 is axially slidable with respect to the sleeve 47a but rotates together with the sleeve 47a. The intermediate gear 46 has an axially extending boss 46a having external spline teeth which are adapted to be engaged with internal spline teeth on the clutch gear 47 when the clutch gear 47 is in the position shown in FIG. 2. The clutch gear 47 can be brought into meshing engagement with the reverse counter gear 49 when it is shifted toward the left. When the clutch gear 47 is in the position shown in FIG. 2, the rotation of the clutch output member 14 is transmitted through the first gear 45 and the intermediate gear 46 to the clutch gear 47 and then through the sleeve 47a to the output shaft 14a to drive the shaft 14a in the forward direction. When the clutch gear 47 is engaged with the reverse counter gear 49, the rotation of the clutch output member 14 is transmitted through the second gear 48 and the reverse counter gear 49 to the clutch gear 47 to drive the output shaft 14a in the reverse direction. The clutch gear 47 can also assume a neutral position wherein it does not engage either of the gears 46 and 49. The output shaft 14a is connected with the input shaft 16 of the transmission 9.

In order to effect the axial movement of the clutch gear 47, there is provided a cylinder 44 which has a piston 44a provided with a piston rod 44b. The piston rod 44b is connected with a shift fork 44c which is in engagement with the clutch gear 47. The piston 44a defines a first pressure chamber 44d at one side thereof and a second pressure chamber 44e at the other side. In the second chamber 44e, there is provided a return spring 44f. The chambers 44d and 44e are connected with a three way select valve 43, which is in turn connected through a branch line 36c with the pressure line 36b. The select valve 43 has a select lever 27 which is swingable about a pivot pin 27a to take either one of R, N, and D positions.

In the R position of the lever 27, the valve 43 connects the pressure chamber 44d with the line 36c to draw the hydraulic pressure to this chamber 44d and opens the chamber 44e to a line 43a leading to the reservoir R. Thus, the piston rod 44b is moved toward left until the clutch gear 47 engages the reverse counter gear 49. In the N position of the lever 27, the chambers 44d and 44e are both opened to the reservoir R and the piston 44a is maintained by the return spring 44f at the position wherein the clutch gear 47 is free of both the gears 46 and 59. In the D position of the lever 27, the valve 43 connects the chamber 44e to the line 36c and opens the chamber 44d through the line 43a to the reservoir R. Thus, the piston rod 44b is moved toward the right to the position shown in FIG. 2 to make the clutch gear 47 engage the intermediate gear 46.

The steplessly variable transmission 9 includes a primary pulley assembly 50 having the aforementioned input shaft 16 and a secondary pulley assembly 52 having the aforementioned output shaft 10. The pulley assemblies 50 and 52 are connected through an endless V-belt 51. The primary pulley assembly 50 includes a stationary flange 50b secured to the input shaft 16 and a movable flange 50a which is axially movable with respect to the input shaft 16. In order to determine the axial position of the movable flange 50a, there is provided a hydraulic actuator 50c. As the hydraulic liquid supply to the actuator 50c increases, the movable flange 50a is shifted toward the stationary flange 50b so that the effective diameter of the primary pulley assembly 50 is increased. Similarly, the secondary pulley assembly 52 includes a stationary flange 52b secured to the output shaft 10 and a movable flange 52a which is axially movable with respect to the output shaft 10. There is provided a hydraulic actuator 52c which serves to move the flange 52a in the axial direction. As the supply of hydraulic liquid to the actuator 52c increases, the movable flange 52a is shifted axially toward the stationary flange 52b so that the effective diameter of the secondary pulley assembly 52 is increased.

The hydraulic actuators 50c and 52c are connected respectively through conduits 50d and 52d with a three way solenoid valve 32 which is connected on one hand through a line 32a with the hydraulic pump 36 and on the other hand through a line 32b with the reservoir R. The solenoid valve 32 has a pair of solenoids 33 and 34. When the solenoid 33 is energized, the hydraulic actuator 50c is connected with the line 32a leading to the hydraulic pump 36, whereas the hydraulic actuator 52b is opened to the line 32b leading to the reservoir R. Thus, the effective diameter of the primary pulley assembly 50 is increased and the effective diameter of the secondary pulley assembly 52 is correspondingly decreased to thereby decrease the speed ratio. When the solenoid 34 is energized, the actuator 52c is connected with the pump 36 and the actuator 50c is opened to the reservoir R so that the effective diameter of the primary pulley assembly 50 is decreased and the effective diameter of the secondary pulley assembly 52 is correspondingly increased to thereby increase the speed ratio. When both the solenoid 33 and 34 are deenergized, the actuators 50c and 52c are disconnected from the lines 32a and 32b so that the speed ratio is maintained constant.

The hydraulic circuit shown in FIG. 2 includes a solenoid relief valve 37 which functions when energized to open the outlet port of the hydraulic pump 36 to the reservoir R. In FIGS. 1 and 2, it will be noted that there is an electronic control unit 22 which is connected with outputs of a throttle valve position sensor 5 for detecting the position of the engine throttle valve 5, an engine speed sensor 13 for detecting the speed NE of the engine 1, a clutch output speed sensor 15 for detecting the speed NC of the clutch output member 14, a select lever position sensor 28 for detecting the position of the select lever 27, a transmission input speed sensor 17 for detecting the speed NP of the transmission input shaft 16, a vehicle speed sensor 18 for detecting the vehicle speed or the speed NO of the transmission output shaft 10, an engine control foot pedal position sensor 24 for detecting that the foot pedal 23 is depressed beyond a predetermined position, and brake sensor 26 for detecting that the brake pedal 25 is actuated to apply the vehicle brakes. There is also provided a road slope sensor 85 for detecting the slope of the road on which the vehicle is running. The control unit 22 may be comprised of a microprocessor having an interface 19, a central power unit 20 and a memory 21 with suitable operating programs.

Figure 5:
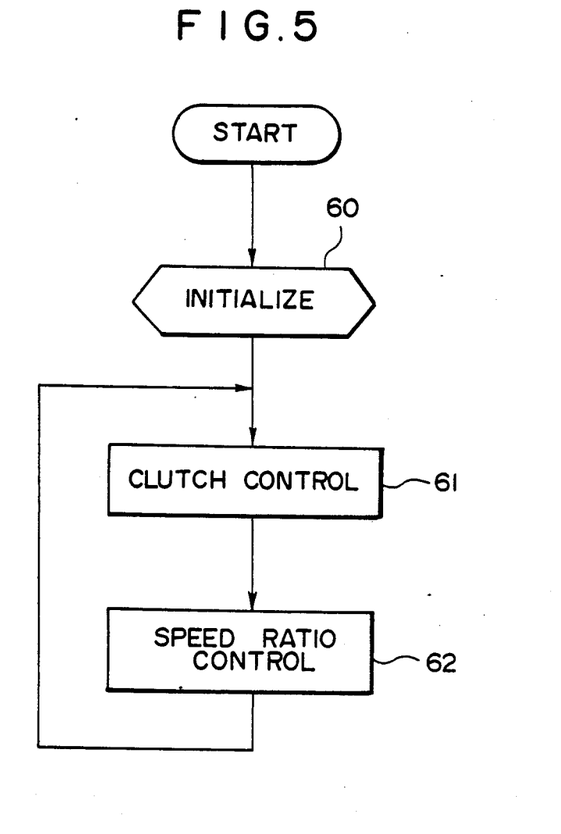
FIG. 5 is a flow chart showing the general transmission control.

The operation of the control unit 22 will now be described with reference to the flow charts shown in FIGS. 5 through 7. Referring at first to FIG. 5, which shows the general control, the system is at first initialized in the step 60. Thereafter, the clutch control routine is carried out at the step 61 and the speed ratio control routine is carried out at the step 62.

Figure 6:
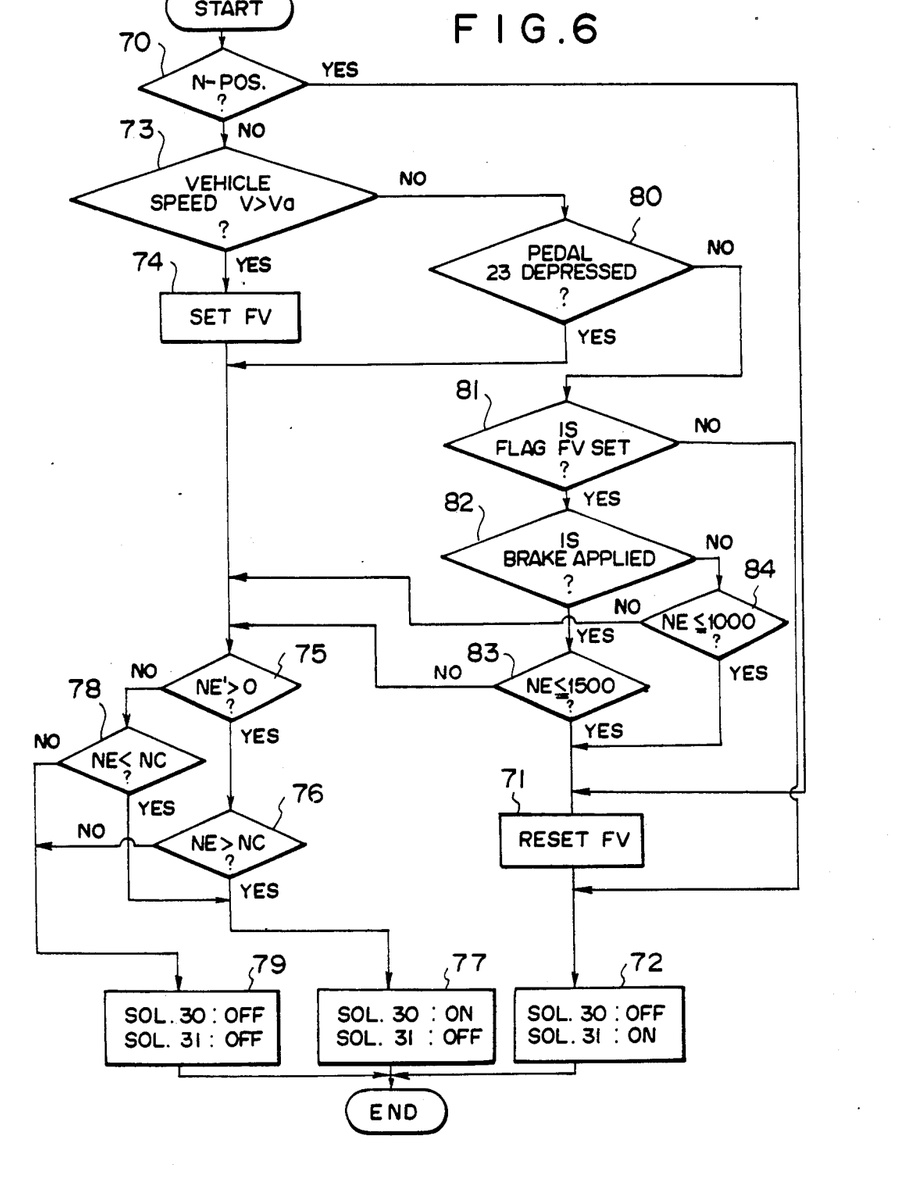
FIG. 6 is a flow chart showing an example of the clutch control.

FIG. 6 shows the clutch control routine in which a judgement is made at the step 70 as to whether the select lever 27 is at the N position. When the select lever 70 is not in the N position, the step 73 is carried out to judge whether the vehicle speed V is greater than a predetermined value Va, for example, 10 km/h. When it is judged that the vehicle speed V is greater than the predetermined value Va, the vehicle speed flag FV is set at the step 74 and the succeeding step 75 is carried out.

In the step 75, a time differential NE' of the engine speed NE is calculated from the output signal of the engine speed sensor 13 and a judgement is made as to whether the differential NE' is positive or not. When it is judged that the time differential NE' is positive and that the engine speed NE is being increased, the succeeding step 76 is carried out. In the step 76, a judgement is made as to whether or not the engine speed NE, or the clutch input speed, is greater than the clutch output speed NC, and a further step 77 is carried out when the engine speed NE is greater than the clutch output speed NC. In the step 77, the solenoid 30 is energized and the solenoid 31 is de-energized to engage the clutch 7 so that the torque transmitting capacity of the clutch 7 is increased. When the judgement in the step 76 is that the engine speed NE is not greater than the clutch output speed NC, the process proceeds to the step 79 wherein both the solenoids 30 and 31 are de-energized so that the torque transmitting capacity of the clutch 7 is maintained.

When it is judged in the step 75 that the time differential NE' is not greater than zero, the step 78 is carried out to judge whether the engine speed NE is smaller than the clutch output speed NC. When the judgement is that the engine speed NE is not smaller than the clutch output speed NC, the aforementioned step 79 is carried out to maintain the torque transmitting capacity of the clutch 7, but when it is judged that the engine speed NE is smaller than the clutch output speed NC, the step 77 is carried out. The progress from the step 75 to the step 76 shows that the engine speed NE is being increased, and the progress from the step 76 to the step 77 shows that the clutch input speed NE is greater then the clutch output speed NC so that it is required to increase the torque transmitting capacity of the clutch 7. This represents a situation wherein the clutch 7 is transmitting driving power with a certain slip between the clutch input member and the clutch output members. The progress from the step 76 to the step 79 shows that the torque transmitting capacity of the clutch 7 is substantially balanced to the load on the output shaft 14 so that the clutch engagement pressure is maintained as it is.

The progress from the step 74 to the step 78 represents a situation wherein the engine speed NE, or the clutch input speed, is being decreased so that it is necessary to judge whether the clutch input speed NE is smaller than the clutch output speed NC. The progress from the step 78 to the step 77 represents for example a situation wherein the operating lever 27 is shifted from the N position to the D position while the vehicle is running. In this situation, the the clutch 7 is not fully engaged and the torque is transmitted with a certain slip between the clutch input and output shafts. The progress from the step 78 to the step 79 represents a decelerating operation under an engine brake function.

When it is judged in the step 70 that the lever 27 is in the N position, the vehicle speed flag FV is reset in the step 71 and the step 72 is then carried out. In the step 72, the solenoid 30 of the solenoid valve 29 is de-energized and the solenoid 31 is energized to disengage the clutch 7.

When it is judged in the step 73 that the vehicle speed V is smaller than the predetermined value Va, a judgement is made in the step 80 as to whether the foot pedal 23 is depressed beyond the predetermined position. If the answer is No, it is judged that the operator is not requiring a large engine output power and a judgement is made in the step 81 as to whether or not the vehicle speed flag FV is set. When the vehicle speed flag FV is set, it is judged that the vehicle speed is not sufficiently decreased, so that a further judgement is made in the step 82 as to whether the vehicle brake is applied by depressing the brake pedal 25. When the vehicle brake is applied, the step 83 is carried out to judge whether the engine speed NE is not greater than 1500 rpm. If the judgement is that the engine speed NE is not greater than 1500 rpm, the steps 71 and 72 are carried out. When it is judged in the step 82 that the vehicle brake is not applied, the step 84 is carried out to judge whether the engine speed is not greater than 1000 rpm. When the judgement is that the engine speed is not greater than 1000 rpm, the steps 71 and 72 are carried out to disengage the clutch 7. When it is judged in the step 83 that the engine speed NE is greater than 1500 rpm or in the step 84 that the engine speed NE is greater than 1000 rpm, the step 75 is carried out.

As described, the clutch 7 is disengaged under different engine speeds depending on whether the vehicle brake is applied or not. This is due to a consideration that, when the vehicle brake is applied, the vehicle speed decrease is faster than when the vehicle brake is not applied, so that there is a greater risk of engine stop under the brake application. When it is judged in the step 81 that the vehicle speed flag FV is not set, the step 72 is carried out to disengage the clutch 7 so as to prevent engine stop.

In the illustrated embodiment of the present invention, the speed ratio of the steplessly variable transmission 9 is controlled so that a desired acceleration rate is maintained substantially throughout the acceleration period. For that purpose, the position $\alpha$ of the engine control foot pedal 23 is continuously detected to find that the foot pedal 23 is depressed for acceleration. The control unit 22 calculates a time differential $\alpha'$ of the position $\alpha$ of the foot pedal 23 and determines a desired acceleration rate GO based on the values $\alpha$ and $\alpha'$. The control unit 22 further receives a transmission output speed signal NO from the sensor 18 and a slope gradient signal K from the slope sensor 85 to calculate a traction force required to maintain the vehicle speed constant. Based on the desired acceleration rate GO and the above traction force, the control unit 22 calculates a required engine output power and then determines the engine speed which can produce the required engine output power under a given throttle valve position which is determined by the position $\alpha$ of the foot pedal 23. The required engine speed determines a required transmission input speed NP and the control unit 22 then determines a required speed ratio of the transmission 9.

Figure 3:
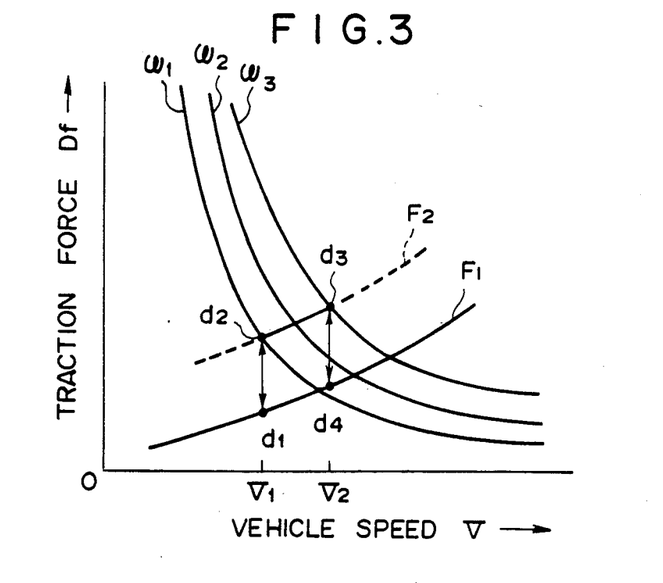
FIG. 3 is a diagram showing the relationship between the vehicle speed and the required traction force.
Figure 4:
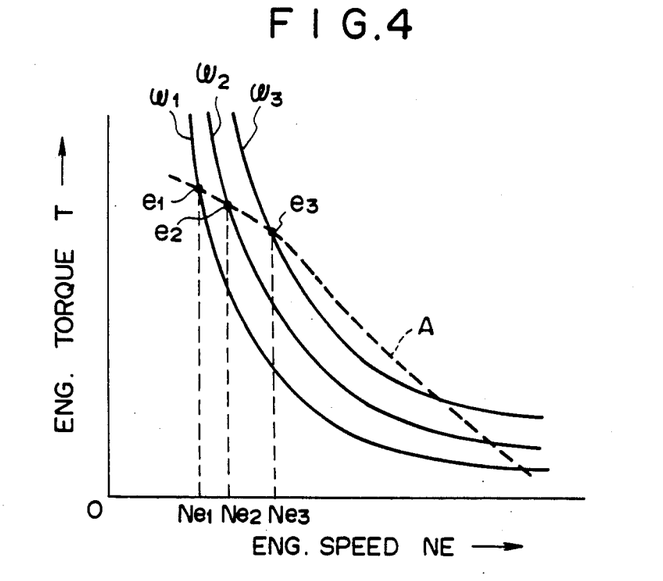
FIG. 4 is a diagram showing the relationship between the engine speed and the engine output torque.

Referring to FIG. 4, curves $W_1$, $W_2$, and $W_3$ respectively show constant engine output power lines, and a curve A shows the relationship between the engine speed NE and the engine output torque T under a given throttle valve opening. The diagram in FIG. 4 shows that under the given throttle valve opening, the engine output power changes depending on the engine speed NE. For example, the output $W_1$ is obtained under the engine speed $NE_1$, whereas the outputs $W_2$ and $W_3$ are respectively obtained under the engine speeds $NE_2$ and $NE_3$. FIG. 3 shows a relationship between the vehicle speed V and the vehicle traction force $D_f$. In FIG. 3, a curve $F_1$ shows the traction force required for maintaining a constant vehicle speed under a given condition. For acceleration, the required traction force increases as shown for example by a curve $F_2$. Supposing that the vehicle is running at a speed $V_1$, the traction force $D_f$ required for maintaining the speed $V_1$ is $d_1$. For acceleration, the traction force $D_f$ has to be increased to a value $d_2$ and then gradually increased along the curve $F_2$ to a value $d_3$. For that purpose, the engine output power has to be increased from the value $W_1$ through the value $W_2$ to the value $W_3$. This engine power increase can be accomplished by increasing the engine speed NE as shown in FIG. 4 from the value $NE_1$ through the value $NE_2$ to the value $NE_3$ by appropriately controlling the speed ratio of the transmission 9 as shown by the program flow chart in FIG. 7.

Figure 7:
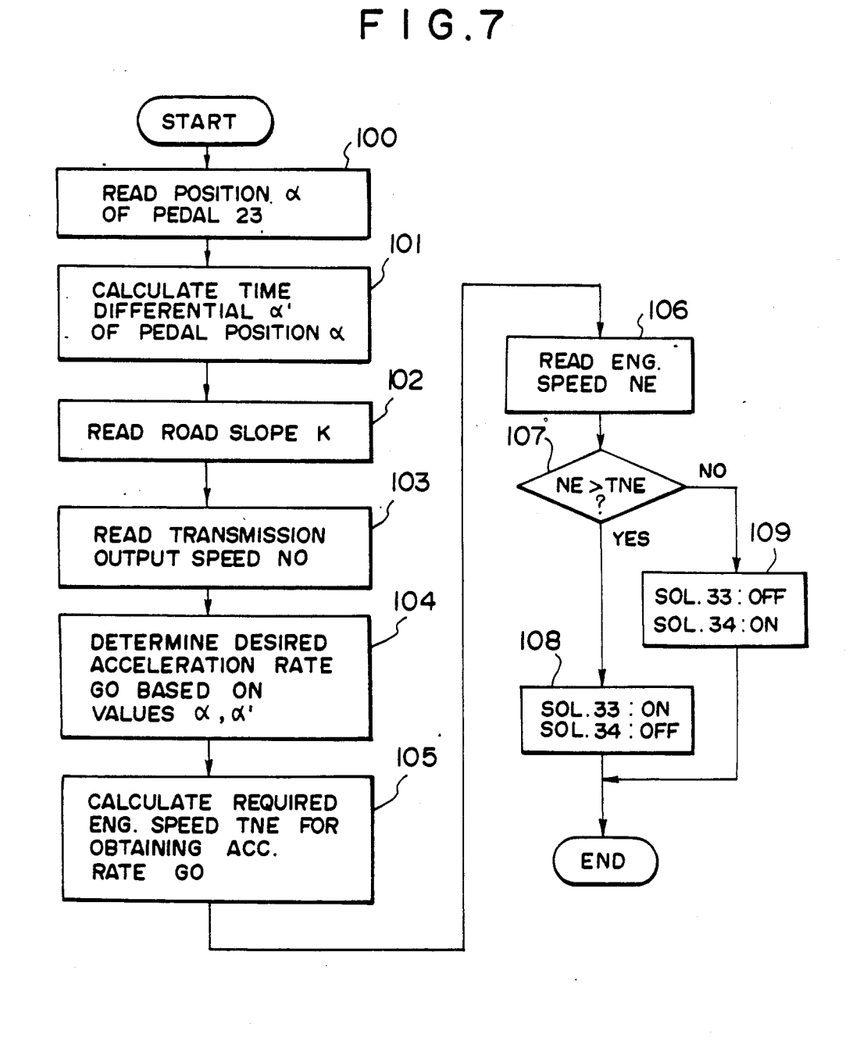
FIG. 7 is a flow chart showing an example of the shift control.

In FIG. 7, the position $\alpha$ of the foot pedal 23 is at first read in the step 100 and a calculation is carried out in the step 101 to obtain the time differential $\alpha'$ of the pedal position $\alpha$. Then, the road slope signal k is read in the step 102 and the transmission output speed NO is read in the step 103. Then, the desired acceleration rate GO is calculated based on the values $\alpha$ and $\alpha'$. For example, the desired acceleration rate GO may be calculated based on the formula $$GO = k_1\alpha + K_2\alpha'$$

where $k_1$ and $k_2$ are constants which may be determined by the formula $$k_1/(k_1+k_2) = \tfrac{3}{4}$$

Thereafter, a calculation is made in the step 105 to obtain an engine speed TNE which is required for accomplishing the desired acceleration rate Go. For that purpose, the traction force $F_1$ required for maintaining the vehicle speed V is at first calculated based on the formula $$F_1 = (\mu_r + \sin K)\ W + \mu_s \cdot A \cdot V^2$$

where $\mu_r$ is a rotating resistance coefficient, W the weight of the vehicle, $\mu_s$ the aeronautical drag coefficient and A the area of the longitudinal projection of the vehicle body. Then, the traction force $F_2$ for accomplishing the acceleration rate Go is calculated based on the formula $$F_2 = F_1 + F_3$$

where $F_3$ is calculated based on the formula $$F_3 = (GO \cdot W/9.8)$$

Thereafter, the engine output power PN required for obtaining the traction force F$_2$ based on the formula $$PN = (9.8/3600) \times F_2 \times V$$

Finally, the engine speed TNE is obtained from an engine performance curve, as for example shown in FIG. 4, for obtaining the output PN under the given position α of the foot pedal 23.

When the required engine speed TNE is thus obtained, the actual engine speed NE is read in the step 106 from the signal of the sensor 13. Then, the actual engine speed NE is compared with the required engine speed TNE in the step 107. When the actual engine speed NE is greater than the required engine speed TNE, the solenoid 33 is energized and the solenoid 34 is de-energized in the step 108 to decrease the speed ratio of the transmission 9. If however the actual engine speed NE is smaller than the required engine speed TNE, the solenoid 33 is de-energized and the solenoid 34 is energized in the step 109 to increase the speed ratio of the transmission 9. When the speeds NE and TNE are equal, both the solenoids 33 and 34 are de-energized to maintain the speed ratio.

In addition to the clutch and speed ratio control, the control unit 22 further produces a signal for operating the throttle valve actuator 4 in accordance with the signals representing the position α of the foot pedal 23 and the position of the throttle valve 3.

The invention has thus been shown and described with reference to a specific embodiment, however, it should be noted that the invention is in no way limited to the details of the embodiment, but changes and modifications may be made without departing from the scope of the appended claims.

We claim:

1. A steplessly variable vehicle power transmission device including steplessly variable transmission means having input means connected with engine means, speed ratio adjusting means for adjusting the speed ratio of said transmission means, engine condition detecting means for detecting a position of an engine output control means to produce an engine condition signal, desired acceleration rate setting means responsive to said engine condition signal from said engine condition detecting means to determine a desired acceleration rate in accordance with said engine condition signal, traction force setting means for determining a required traction force for obtaining said desired acceleration rate, control means for determining a speed ratio of the transmission means which is required for obtaining the required traction force based upon the position of the engine output control means and for controlling said speed ratio adjusting means so that the required speed ratio is obtained to maintain the desired acceleration rate.

2. A transmission device in accordance with claim 1 in which said control means includes means for obtaining a desired acceleration rate based on the position and a rate of change in the position of the engine output control means.

3. A transmission in accordance with claim 2 in which said traction force setting means includes means for obtaining a traction force value based on a vehicle speed, and memory means for memorizing a relationship between a vehicle traction force and an engine output power for obtaining a desired acceleration rate under a given vehicle speed and for memorizing a relationship between an engine speed and an engine output power under a given position of the engine output control means.

4. A transmission in accordance with claim 1 in which said engine output control means is a foot pedal, said engine condition detecting means including position detecting means for detecting the position of the foot pedal.

5. A transmission device in accordance with claim 2 in which further means is provided for detecting a slope gradient of a road on which the vehicle is running, said control means including means for determining a traction force necessary for maintaining a constant vehicle speed based on a signal representing the road slope gradient.

6. A method for controlling a speed ratio of a steplessly variable vehicle transmission comprising the steps of detecting a change in position of an engine output control member, determining a required vehicle acceleration rate in accordance with the change in the position of the engine output control member, determining a traction force for obtaining the required acceleration rate based upon vehicle speed, road slope gradient, and required acceleration rate, determining engine output power required for obtaining the traction force, determining the engine speed at which said engine output power can be obtained under a given position of the engine output control member, and adjusting the speed ratio of the transmission so that said acceleration rate is obtained.

7. A steplessly variable vehicle power transmission device including steplessly variable transmission means having input means connected with engine means, speed ratio adjusting means for adjusting the speed ratio of said transmission means, engine condition detecting means for detecting at least one of a position of and a rate of change in position of an engine output control means to produce an engine condition signal, desired acceleration rate calculating means for calculating a desired acceleration rate based on a given function and the engine condition signal, first traction force calculating means for calculating a first traction force in accordance with a vehicle speed and a road condition, additional traction force calculating means for calculating an additional traction force required for obtaining the desired acceleration rate, total traction force calculating means for calculating a total traction force required for obtaining the desired acceleration rate based on the first traction force and the additional traction force, means for calculating a required engine output power for producing the total traction force, means for obtaining an engine speed which is required for producing the required engine output power under the position of the engine output control means, and means for adjusting the speed ratio adjusting means so that said engine speed is obtained to maintain the desired acceleration rate.

* * * * *